T. C. CLARKE.
FILTER.

No. 30,300.  Patented Oct. 9, 1860.

Witnesses;
Lemuel W. Serrell
Chas. H. Smith

Inventor;
T. Cottrell Clarke

UNITED STATES PATENT OFFICE.

T. COTTRELL CLARKE, OF CAMDEN, NEW JERSEY.

FILTER.

Specification of Letters Patent No. 30,300, dated October 9, 1860.

*To all whom it may concern:*

Be it known that I, T. COTTRELL CLARKE, of Camden, in the county of Camden and State of New Jersey, have invented, made, and applied to use a certain new and useful Improvements in Filters, which I denominate the "Self-Cleaning Water-Filter;" and I do hereby declare that the following is a full, clear, and exact description of the construction and operation of the same, reference being had to the annexed drawing, making part of this specification, wherein—

Figure 2:
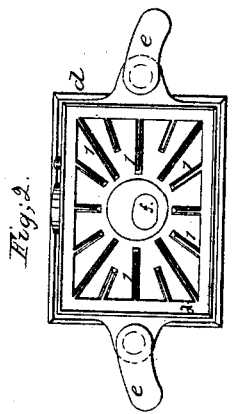
Figure 1:
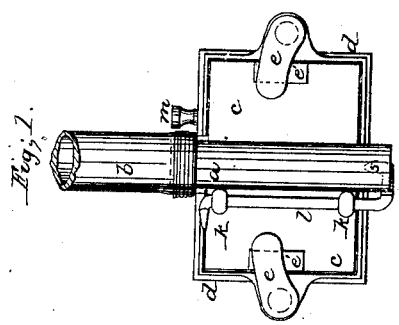
Figure 3:
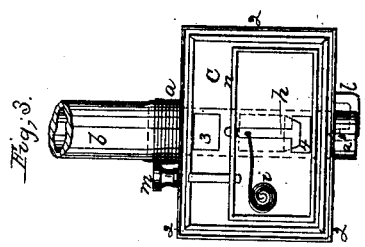
Figure 4:
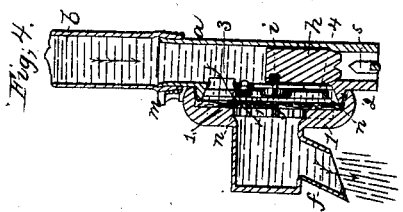

Figure 1, is back elevation of my said filter. Fig. 2, is an elevation of the front plate with the filtering medium and back plate removed. Fig. 3, is an elevation of the interior of the back plate, and Fig. 4 is a cross section.

Similar marks of reference denote the same parts.

In the construction of filters for water difficulties arise from the sediment that is retained on one side of the filter. To prevent the filtering medium becoming stopped up or inoperative the filters have been fitted to reverse, to wash out the sediment. This plan through negligence is not fully available. Felt has also been used for filtering, but the sediment, unless removed each time the water is drawn, percolates through and the filter becomes useless.

The nature of my said invention consists in a self-cleaning filter that allows for the sediment to pass off from the filter each time the water is drawn, or whenever desired, so that the filtering medium is cleansed without reversing and an accumulation of sediment is entirely prevented.

In the drawing $a$ is a pipe connected by the india rubber tube $b$, or any suitable coupling to a faucet or cock.

$c$, is the back plate and $d$ the front plate of my filter. The former sets within a rim around the latter, and between them the flat piece of felt or other filtering material $g$ is placed, the flange 2, on the back plate $c$, acting to confine the same.

$e$, $e$, are turn buttons on $d$, taking inclines $e'$, $e'$, on $c$, by means of which the plates $c$, and $d$, are firmly compressed together, or may be disconnected for washing the felt $g$ or putting in a new piece. The inner surface of the front plate $d$, is fitted with ribs 1, 1, radially from the opening to the pipe $f$, so that the said ribs keep the felt from the plate and form water ways or channels for the filtered water to pass away by said pipe $f$.

The pipe $a$, is continued and formed with a seat receiving the valve $h$, which valve should be sustained by a spring $i$, only sufficiently strong to lift the valve from its seat in order that the rush of water in entering the filter shall keep the said valve closed so long as the water continues to run, but so soon as the pressure is shut off, the spring $i$ lifts said valve and the sediment or foul water runs out through the opening 4 and escapes.

It will be evident that any desired character of valve may be used for allowing the foul water to escape, and in order to permit a current of water to run through the filter when required for washing it out I provide the slide $l$, sustained in the blocks $k$ and having a point 5, under the valve $h$, by the raising of which the valve can be held open; and in cases where the spring $i$, is not used the raising of this valve $h$, allows the filter to be washed out as often as desired or for the passage of unfiltered water.

In case the back of the felt or filtering medium $g$ should become coated with any sediment not easily washed away, I may make use of the sliding scrapers $n$, actuated by the handle $m$, which will remove any substance adhering from the water on said felt.

My filter is cheap, easily constructed, can be opened for cleansing or changing the filtering medium, and through it the filtered water can be drawn, and then the foul water or sediment let off by a separate opening, or unfiltered water can be drawn when desired.

What I desire to secure by Letters Patent is—

1. In a filter for water, an opening or escape on the supply side of the filtering medium, controlled in the manner set forth and for the purposes specified.

2. The slide $l$, in combination with the valve $h$, for opening said valve to clean the filter or draw unfiltered water as specified.

3. The construction of the divided case $c$, $d$, kept together by the turn buttons $e, e$, and provided with the ribs 1, 1, forming the water channels, in the manner and for the purposes specified.

In witness whereof I have hereunto set my signature this twenty sixth day of July, 1860.

T. COTTRELL CLARKE.

Witnesses:
LEMUEL W. SERRELL,
CHAS. H. SMITH.